Figure 1:
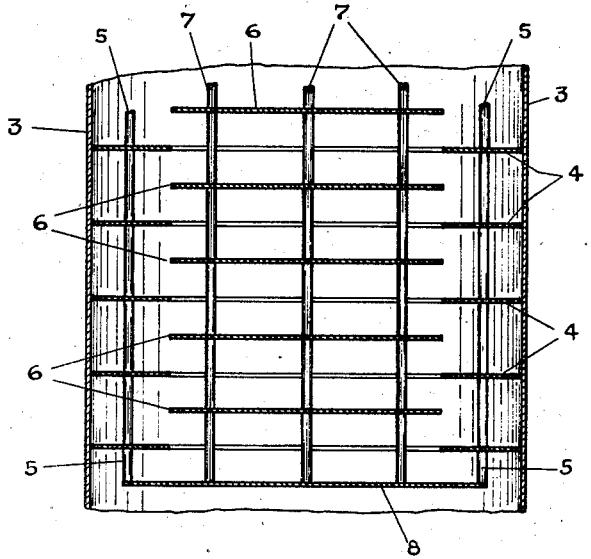

May 28, 1946.   R. F. THOMPSON   2,400,962

EXTRACTOR

Filed Dec. 11, 1942

INVENTOR.
Robert F. Thompson.
BY
ATTORNEYS

Patented May 28, 1946

2,400,962

UNITED STATES PATENT OFFICE 2,400,962

EXTRACTOR

Robert F. Thompson, Narrows, Va., assignor to Celanese Corporation of America, a corporation of Delaware Application December 11, 1942, Serial No. 468,653

4 Claims. (Cl. 23—270.5)

This invention relates to extraction towers and relates more particularly to an extraction tower suitable for use in the concentration of organic compounds from their aqueous solutions by solvent or extraction methods, such as the concentration of dilute aqueous solutions of lower aliphatic acids, for example acetic acid. The extraction tower of my invention is particularly suitable for the concentration of the dilute solutions of acetic acid obtained during the acetylation of cellulose to form cellulose acetate.

In concentrating dilute solutions of lower aliphatic acids by solvent or extraction methods involving countercurrent flow, it is essential that a maximum of continuous intimate contact be provided between the immiscible extraction medium which flows in one direction and the dilute solution being extracted which flows in the opposite direction. Other things being equal, providing undesirable emulsions are not formed, the more intimate and continuous the contact between the extractant and the solution being extracted, the more efficient will be the extraction and, as a result, the percentage of acid removed from the aqueous solution will be high and the amount of acid lost in the aqueous tailings discharged from the process will be at a minimum. In addition to providing an efficient liquid to liquid contact, the apparatus employed should be so designed that sludges and gummy materials precipitated during the extraction process may be easily and efficiently removed without an extended costly shut down for cleaning. In the concentration of dilute aqueous solutions of lower aliphatic acids, the sludges or gummy materials which are precipitated comprise numerous dissolved substances which are soluble in the dilute aqueous solution of the lower aliphatic acid but which are insoluble in water alone or in such mixtures of aliphatic acid and extractant as are formed during the extraction process. The sludges and gummy materials which are precipitated tend to settle out on any available surface and to block the open passages through the extraction tower. These materials must be removed periodically in order that the efficiency of the extraction process be maintained at a maximum. In the usual type of extraction tower wherein Raschig rings, stoneware saddles and the like, or bubble cap plates are utilized to provide the necessary intimate liquid to liquid contact, the surfaces quickly become fouled. In such cases, the extraction tower must be cleaned or the Raschig rings or saddles replaced at relatively short intervals to maintain efficient operation. These frequent shut-downs for cleaning operations constitute a distinct hindrance in maintaining peak efficiency and economic production.

It is accordingly an important object of my invention to provide an improved extraction tower which will be free from the foregoing and other disadvantages and which will be especially simple in construction, efficient in operation and inexpensive in cost.

Another object of my invention is the provision of an extraction tower of improved design whereby water and like impurities may be removed from aqueous solutions of lower aliphatic acids by solvent or extraction methods in a highly efficient manner.

Still another object of my invention is the provision of an extraction tower of such construction that sludges, gummy materials and other solid matter deposited therein during the purification process may be easily removed therefrom.

A further object of my invention is the provision of an extraction tower for the concentration of aqueous solutions of lower aliphatic acid, which tower is so designed that highly intimate contact is maintained between the solvent or extractant and the aqueous solution being extracted.

Other objects of my invention will appear from the following detailed description and drawing.

Figure 2:
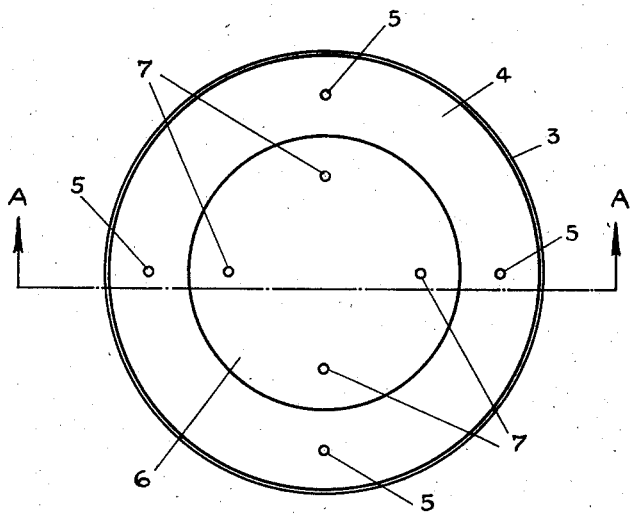

In the drawing wherein a preferred embodiment of my invention is shown and wherein like reference numerals refer to like parts throughout the several views, Fig. 1 is a front elevational view of a portion of the extraction tower, partly in section, showing the position of the plates therein and the plate supports, and Fig. 2 is a plan view of the extraction tower shown in Fig. 1.

The front elevational view which comprises Fig. 1 is a view taken along the line A—A in Fig. 2.

Referring now to the drawing, and particularly to Fig. 1, the extraction tower of my invention comprises an outer cylindrical shell, indicated by reference numeral 3, which shell may be of any convenient length and of any diameter, depending upon the volume and the nature of the solution being concentrated. Inside of the cylindrical shell 3 are positioned a plurality of annular plates 4 conveniently spaced and supported as by means of rigid spacer rods 5. Alternating with annular or ring-shaped plates 4 and spaced equidistantly therebetween are a plurality of circular plates 6 supported in fixed position by rigid spacer rods 7. The bottom plate 8 in the tower is fixed not only to spacer rods 7 which hold the circular plates in position but also to spacer rods 5 as well.

The extraction tower may be constructed so that it comprises a single unitary cylindrical shell of any desired length filled throughout with a plurality of alternating annular and circular plates supported, as shown, by the several spacer rods 5 and 7. If desired, it may be constructed so that it comprises a number of individual units each comprising an external cylindrical shell within which the respective rings, plates and spacer rods are suitably supported, and any number of such units may be joined together as by flanged joints (not shown), the respective units being bolted together at said flanges to form a tower of any desired height.

The diameter of the tower will depend, of course, on the volume of dilute solution being concentrated in a given period of time, while the height of the tower will depend on the nature of the dilute solution and the properties of the solvent or extractant which is employed. When solvents or extractants lighter than the aqueous solution being extracted are employed, the aqueous solution is entered at the top of the tower with the extractant entering at the base, and the liquids flow counter-currently to each other. The organic liquid-laden extractant rises to the top and is passed, usually, to a distillation operation, where the extractant is stripped from the extracted organic liquid, while the extracted aqueous solution falls to the bottom where it is discharged.

The circular plates and the ring-shaped annular plates may be of varying relative dimensions. The diameter of the circular plates may be equal to the inner diameter of the annular plates, or the circular plates may be of greater diameter and overlap the rings. Preferably, the diameter of the circular plates is substantially equal to the inner diameter of the annular, ring-shaped plates. When the plates are of such dimensions, both members may be cut conveniently from the same sheet, the central, circular portion forming the circular plate 6 and the ring-shaped outer portion forming the annular plate 4. The cross-sectional area of each of the circular plates 6 and of each of the rings 4 may vary. For any given diameter of shell 3 the dimensions of the rings and circular plates may be such that the ring 4 may occupy from 20 to 80% of the cross-sectional area of the shell and the plate 6 from 80 to 20% of said cross-sectional area. When the ring and plate overlap, they will, of course, have a combined area of more than 100% of the cross-sectional area of the cylindrical shell. Preferably, however, for any given shell diameter the dimensions of the circular plate is such that it occupies about 40% of the cross-sectional area of the shell and the ring occupies about 60% of said area. While either the circular plates 6 or the annular plates 4, or both, may be perforated, they are preferably imperforate.

This novel extraction tower structure, comprising alternating plates and rings arranged in the manner heretofore described, serves as an extremely efficient means for carrying out counter-current extraction operations. It is particularly suitable, as stated, for the counter-current extraction and concentration of dilute aqueous solutions of lower aliphatic acids, but it may, of course, be employed in extraction processes involving the extraction of other chemical compounds. The arrangement of the rings and plates not only provides a most thorough and intimate mixing of the extractant with the solution being extracted as said solutions flow counter-currently to each other, but the swirling motion imparted to the flowing liquids serves to prevent the sludges and gummy materials from settling out on the surfaces of the rings or plates. The sludges and other solid materials are kept in motion and gradually fall to the base of the tower, being run off as granules in the extracted waste. When the tower eventually does foul up after 6 to 26 weeks of continuous operation it may be cleaned thoroughly by passing wet steam through it for several hours and then washing the tower down with hot water. The sludges and gummy materials slip down from plate to plate and are removed at the base of the column. The entire cleaning operation takes a relatively short time since the tower does not have to be dismantled. The tower is normally back in operation 24 hours after being taken out of service for cleaning, an extremely short period of time when considering the extended period over which the tower is in highly efficient operation.

While my novel extraction tower has been more particularly described as being cylindrical in shape and having circular plates and rings therein, it will, of course, be understood that the tower as well as the plates may be of any desired geometrical shape, for example, triangular, square, pentagonal, or other polygonal shape having any desired number of sides. Furthermore, the plates themselves may have serrated or scalloped edges and may be made with a definite pitch so that material falling on them will flow toward the outside of the tower while the rings may be pitched to cause material falling thereon to flow toward the center of the tower.

The materials of construction of the tower are chosen so that they may resist any corrosive action by the solutions being extracted or the solvent or extractant being employed. Such materials may be copper, glass, bronze, stainless steel or any other suitable material. If it is desired to carry out the extraction at elevated temperatures the tower may be suitably insulated.

It is to be understood that the foregoing detailed description is given merely by way of illustration and that many variations may be made therein without departing from the spirit of my invention.

Having described my invention what I desire to secure by Letters Patent is:

1. In a device for concentrating fluid organic compounds by extraction methods, a vertical tower, a plurality of spaced annular plates in engagement with the inner surface of said tower, and a plurality of imperforate circular plates spaced from said tower and alternating with said annular plates, the area of each of said imperforate plates being the same as the area of the opening in said annular plates and the several plates being so positioned as to define a tortuous path to fluids passing through said tower.

2. In a device for concentrating fluid organic compounds by extraction methods, a vertical tower, a plurality of spaced annular plates in engagement with the inner surface of said tower, and a plurality of imperforate circular plates spaced from said tower and alternating with said annular plates, the area of each of said imperforate plates being the same as the area of the opening in said annular plates and comprising from 20 to 80% of the cross-sectional area of said tower, and the several plates being so positioned as to define a tortuous path to fluids passing through said tower.

3. In a device for concentrating fluid organic compounds by extraction methods, a vertical tower, a plurality of spaced annular plates in engagement with the inner surface of said tower, and a plurality of imperforate circular plates spaced from said tower and alternating with said annular plates, the area of each of said imperforate plates being the same as the area of the opening in said annular plates and comprising 40% of the cross-sectional area of said tower, and the several plates being so positioned as to define a tortuous path to fluids passing through said tower.

4. In a device for concentrating fluid organic compounds by extraction methods, a vertical tower, a plurality of spaced annular plates in engagement with the inner surface of said tower, a plurality of imperforate circular plates spaced from said tower and alternating with said annular plates, and a plurality of vertical rods on which said plates are mounted, the area of each of said imperforate plates being the same as the area of the opening in said annular plates and comprising 40% of the cross-sectional area of said tower, and the several plates being so positioned as to define a tortuous path to fluids passing through said tower.

ROBERT F. THOMPSON.